Patented July 11, 1939

2,165,372

UNITED STATES PATENT OFFICE 2,165,372

PRODUCTION OF A HIGH QUALITY LUBRICATING OIL

Wolfgang Haag, Mannheim, and Gerhardt Hofmann and Hermann Zorn, Ludwigshafen-on-the-Rhine, Germany, assignors to I. G. Farbenindustrie Aktiengesellschaft, Frankfort-on-the-Main, Germany No Drawing. Application August 14, 1936, Serial No. 96,054. In Germany August 17, 1935

6 Claims. (Cl. 196—10)

The present invention relates to the production of high quality lubricating oils and is more particularly concerned with a process making use of the polymerization of gaseous olefines.

It is already known that gaseous olefines can be polymerized by the action of anhydrous aluminum chloride or mixtures of the same with iron chloride, titanium chloride or boron fluoride. In this way liquid polymerization products are formed some of which are of the nature of lubricating oil. Polymerizations of the said kind have already been carried out in the presence of inert solvents, as for example petroleum ether or benzine. In one of these processes it has already been observed that the yield of polymerization products is bad when the hydrocarbon is not wholly pure or not wholly free from water. Very thorough investigations of these reactions have always led to the result that products similar to lubricating oils are thereby obtained only in small yields. Furthermore the said products have so low a viscosity index and so bad an oxidation test that they are not in the least comparable with natural lubricating oils.

We have now found that in the polymerization of ethylene or gas mixtures containing the same by means of anhydrous aluminum chloride in the presence of inert solvents not only can lubricating oils be obtained in high yields but also with surprisingly good properties by taking care that the gases are entirely free from oxygen and sulphur and their compounds. It has been found that the said substances have a very unfavorable influence on the reaction, even when present in small amounts. Such injurious substances include not only oxygen and sulphur but also for example carbon monoxide, carbon dioxide, hydrogen sulphide, carbon oxysulphide, aldehydes, alcohols, esters and mercaptans. Such impurities are always present in gases which contain olefines, such as natural gases, cracking gases, coke-oven gases, low temperature carbonization gases and also the gases obtained by the dehydrogenation of the paraffin hydrocarbons contained in the waste gases from the destructive hydrogenation of carbonaceous materials. They are also contained in the gases which are obtained in the preparation of acetylene from the hydrocarbons of the paraffin series by treatment in the electric arc. Injurious substances, such as aldehydes, alcohols and esters are also formed in the production of ethylene and its homologues by the splitting off of water from alcohols, and injurious substances are also contained in ethylene or its homologues which have been prepared by splitting off hydrogen halides from the corresponding alkyl halides, as for example in the splitting off of hydrogen chloride from ethyl chloride. All these injurious substances are frequently present in the gaseous olefines in only very small amounts so that they can only be detected by the finest analytical means or even only by their odor. These small amounts of impurities are, however, sufficient to influence quite considerably the course of the reaction so that either the quality of the polymerization products is greatly impaired or the reaction is almost entirely stopped. For example, a content of 2 per cent or still less of carbon monoxide in ethylene is sufficient to cause the formation of a lubricating oil having a viscosity index of only 26 or still less while when working with pure ethylene according to this invention an oil is obtained having a viscosity index of 90 or more.

Other gaseous impurities, such as hydrogen, nitrogen or methane, on the other hand, have no injurious influence provided they are not present in too large an amount. However, when using gas mixtures containing olefines for the polymerization, the concentration of the olefines in these mixtures may exert a considerable influence on the yield and quality of the polymerization products. In order to obtain good lubricating oils, it is generally speaking necessary to work with gases which contain at least 70 per cent, and advantageously at least 80 or even 90 per cent of gaseous olefines.

The purification of the gases and if necessary the enrichment of the gaseous olefines therein can be effected to a great extent by means of known physical methods, such as adsorption with active carbon or silica gel or liquefaction and subsequent fractional distillation in a Linde plant. These physical methods are, however, insufficient for the removal of the last traces of obnoxious impurities and one or more chemical methods must also be used. Such chemical methods may consist for example, depending on the nature of the impurities, of washing with caustic alkali solutions, leading over anhydrous calcium chloride or over chromic acid applied to pumice, or leading the gases through fused sodium amide or treating the gases with organic bases or solutions of the same or also with solutions of salts of strong bases with weak acids, as for example the sodium salt of alanine. These chemical purification processes are advantageously carried out under increased pressure, as for example between about 5 and about 50 atmospheres. The temperature to be used in the purification depends on the nature of the purifying agent and the impurities to be removed.

It has also been found that the material of the reaction vessels in which the polymerization is carried out is of considerable influence on the yield and nature of the polymerization products. In order to obtain high quality lubricating oils, i. e. oils the properties of which are equal to or in some cases superior to those of the best natural products, the Pennsylvanian oils, there must be used for the reaction vessels materials which have no unfavorable catalytic influence on the polymerization process. It has been found that ordinary iron, such as cast iron or wrought iron and also ordinary non-alloy steels have an injurious action on the course of the polymerization. Suitable materials for the construction of the apparatus, which must naturally also have the necessary mechanical strength and a sufficient stability to corrosion by the aluminum chloride, are on the other hand nickel and chromium and steels alloyed with nickel and/or chromium. It is not necessary to prepare the whole reaction vessel from these constructional materials, but it is sufficient for the internal parts coming into contact with the reacting substances to be of the said materials. At all the said parts, however, the use of iron or ordinary steels, even in small amounts, must be avoided. The polymerization may also be carried out in vessels which are lined for example with lead, tin or zinc. These materials have the drawback, however, that their stability to corrosion is smaller than that of the above mentioned substances.

Finally it has been found that the nature of the aluminum chloride is of great importance for the course of the polymerization. The aluminum chloride should not contain more than 5 per cent and advantageously less than 2.5 per cent of residue incapable of sublimation, such as aluminum oxide, hydroxide or oxychloride. A content of iron chloride is not injurious, but a content of iron oxide or similar non-volatile substances is injurious. In order, during the introduction of the aluminum chloride into the autoclave, to avoid the formation of non-volatile compounds, such as aluminum oxide and the like, by the action of the moisture in the air, it is preferable to use the aluminum chloride in the form of its liquid addition compounds with olefines which can be prepared, as is already known, from liquid or gaseous olefines while excluding atmospheric moisture.

All paraffin hydrocarbon mixtures, as for example petroleum ether or the paraffin hydrocarbon mixtures which are obtained by the hydrogenation of the products formed by cracking paraffin waxes, fats and fatty oils, are suitable as inert solvents for dissolving the olefines and for suspending the aluminum chloride or its addition compounds with olefines. Fused commercial hard and soft paraffin waxes are also suitable as solvents although their recovery from the resulting polymerization product is somewhat more troublesome than that of the aforesaid liquid hydrocarbons. The oils obtained as first runnings in a previous polymerization are also very suitable as solvents. Their use offers the advantage that no foreign hydrocarbons at all are present during the polymerization. The whole crude polymerization product may, however, also be used as a solvent.

The polymerization may be carried out at any suitable temperature. When working at ordinary room temperature or at even lower temperatures, the reaction usually proceeds slowly. It is, therefore, preferred to employ higher temperatures, for example by heating the reaction vessel to 70° or 80° C. At this temperature a rapid exothermic reaction sets in, which may cause the temperature in the reaction vessel temporarily to rise as high as 230° or 250° C.

The lubricating oils obtained are distinguished by a good viscosity index of from 80 to 100 or more, a very low setting point of from 20° to 30° below zero centigrade, a good Sligh oxidation test of 0 and a very low Conradson coke test of about 0.1. They are miscible in all proportions with natural lubricating oils.

The following examples will further illustrate how this invention may be carried out in practice, but the invention is not restricted to these examples.

*Example 1*

2 liters of petroleum ether and 125 grams of aluminum chloride are introduced while stirring into an autoclave of 5 liters capacity made of NCT$_6$-metal (62.3 per cent of nickel, 1.75 per cent of manganese, 12.5 per cent of chromium and 22.8 per cent of iron). A gas of the composition:

| | Per cent |
|---|---|
| Ethylene | 94.15 |
| Propylene | 0.5 |
| Nitrogen | 2.15 |
| Methane | 1.1 |
| Ethane | 1.9 |
| Propane | 0.2 | which has been obtained by the catalytic dehydration of ethyl alcohol and which has been washed under a pressure of 60 atmospheres with concentrated caustic soda solution and then led over anhydrous calcium chloride, is then pressed in until the pressure amounts to 50 atmospheres. The whole is then heated to 120° C.; after about an hour, the pressure has fallen to 12 atmospheres while a strong evolution of heat simultaneously takes place. Gas is then pressed in continuously until the autoclave is filled with liquid polymerization product. The contents of 4.5 liters are run off and water is added thereto. The solvent and the first runnings of oil are then distilled off and the resulting lubricating oil is aftertreated with 2 per cent of bleaching earth. 1420 grams of a lubricating oil boiling above 170° C. at 1 millimeter (mercury gauge) are obtained. The oil has the following characteristics:

| | |
|---|---|
| Viscosity at 38° C. degrees Engler | 111.6 |
| Viscosity at 99° C. do | 5.140 |
| Viscosity index | 84 |
| Sligh oxidation test | 0 |
| Coke test | 0.13 |
| Setting point | 35° below zero C |

If, instead of the aforesaid gas, a gas be used which contains 2 per cent of carbon monoxide, there are obtained under the same conditions only 2.6 liters of total product. After decomposition with water and distilling off the solvent and the first runnings of oil, there are obtained 210 grams of a lubricating oil boiling above 170° C. at 1 millimeter (mercury gauge) which has the following viscosity:

| | |
|---|---|
| Viscosity at 38° C. degrees Engler | 7.01 |
| Viscosity at 99° C. do | 1.50 |
| Viscosity index | 26.6 |

If a gas containing 10 per cent of carbon monoxide be used, a much smaller amount of oil is obtained and its viscosity index has fallen to −10.

Example 2

2 liters of a first runnings oil, such as is obtained in the working up of an ethylene polymerization product obtained according to Example 1, are charged into an autoclave lined with nickel with 125 grams of an aluminum chloride containing 2.3 per cent of residue incapable of sublimation while stirring. While heating to 90° C., ethylene of 98 per cent purity (prepared by the dehydration of alcohol and led through a washing tower filled with caustic soda solution and then through a tower filled with anhydrous calcium chloride) is pressed in until the pressure is 44 atmospheres. After 4¾ hours, the autoclave has become filled with liquid reaction product. The contents are worked up in the manner described in Example 1. 1590 grams of lubricating oil are obtained having the following characteristics:

Viscosity at 38° C_____degrees Engler__ 118.5
Viscosity at 99° C_____do____ 5.83
Viscosity index_____ 94

If, instead of the said aluminum chloride, an aluminum chloride containing 5.1 per cent of residue incapable of sublimation, there are obtained after 4¾ hours under the same conditions and after working up in the same manner, only 1150 grams of lubricating oil having the following characteristics:

Viscosity at 38° C_____degrees Engler__ 90.0
Viscosity at 99° C_____do____ 4.18
Viscosity index_____ 73.8

When working with the said aluminum chloride containing 2.3 per cent of residue incapable of sublimation, but in an iron autoclave, the fall in pressure after 24 hours when using a nonpurified gas is only 24 atmospheres. Upon emptying the autoclave it is found that the aluminum chloride has separated as a spongy mass on the still very pale solvent. By working up the contents of the autoclave, 47 grams of a product are obtained which has the following characteristics:

Viscosity at 38° C_____degrees Engler 68.8
Viscosity at 99°_____do____ 2.47
Viscosity index_____ −70

By working under the same conditions with purified gas, there are obtained during 24 hours 920 grams of lubricating oil having the following characteristics:

Viscosity at 38° C_____degrees Engler__ 80
Viscosity at 99° C_____do____ 3.56
Viscosity index_____ 54.5

Example 3

An autoclave of 44 liters capacity, lined with V2A-steel (20 per cent of chromium, 8 per cent of nickel and 72 per cent of iron) and provided with a stirring device is charged with 13 liters of petroleum ether and to this there is added a liquid addition compound of aluminum chloride with olefines which has been prepared by adding 1.5 kilograms of aluminum chloride having only 1.5 per cent of sublimation residue to a mixture of 1.5 liters of distillation first runnings obtained according to Example 1 and 1 liter of a paraffin wax cracking product which boils between 20° and 260° C. and stirring the whole for half an hour at from 60° to 70° C. Ethylene which has been led under pressure first through concentrated caustic soda solution and then over dehydrated calcium chloride is then pressed in while heating to 80° C. until the pressure amounts to 35 atmospheres. After the reaction has set in, the pressure falls and ethylene is continually pressed in until the autoclave is filled with liquid reaction product. After 6 hours, the contents are run off and worked up as described in Example 1. 16.6 kilograms of a lubricating oil boiling above 150° C. at 1 millimeter pressure (mercury gauge) are obtained which has the following characteristics:

Viscosity at 38° C_____degrees Engler__ 58.9
Viscosity at 99° C_____do____ 4.11
Viscosity index_____ 103

Example 4

2 liters of a fraction boiling between 180° and 260° C. of a hydrogenated paraffin wax cracking product (iodine value 0) and 125 grams of an aluminum chloride containing 2.3 per cent of sublimation residue are charged into an autoclave of V2A-steel of 5 liters capacity. While stirring, a gas having the composition:

| | Per cent |
|---|---|
| Nitrogen | 0.7 |
| Methane | 3.8 |
| Ethylene | 75 |
| Propylene | 20 |
| Hydrogen sulphide | 0.5 | is pressed in, the said gas being first freed from hydrogen sulphide by washing with caustic soda solution. Simultaneously with the leading in of the said gas, the whole is heated to from 80° to 90° C. and the gas led in continuously. After 6½ hours, the contents of the autoclave (4.1 liters) are run off, decomposed with water and worked up in the manner described in Example 1. 1395 grams of a lubricating oil boiling above 150° C. under a pressure of 1 millimeter (mercury gauge) are obtained having the following characteristics:

Viscosity at 38° C_____degrees Engler 161
Viscosity at 99° C_____do____ 7.38
Viscosity index_____ 95

If the washing of the gas with caustic soda solution be omitted, the pressure falls from 55 atmospheres to only 52 atmospheres after stirring for 6 hours. The aluminum chloride is converted into 175 grams of a spongy mass and no formation of lubricating oil takes place.

Example 5

30 liters of first runnings oil and 3.7 kilograms of anhydrous aluminum chloride containing only 1.5 per cent of residue incapable of sublimation are charged while stirring into an autoclave of 120 liters capacity prepared from a steel containing 6 per cent of chromium. Ethylene which has been washed under pressure with caustic soda solution and dried over calcium chloride is led in until the pressure is 40 atmospheres and the whole heated; as soon as the temperature reaches from 80° to 100° C., the exothermic polymerization reaction sets in. Purified ethylene is led in at a temperature of from 110° to 120° C. until the autoclave is filled with liquid reaction product. The reaction product is freed from aluminum chloride sponge by decantation and freed from the residual aluminum chloride by treatment with slaked lime at 120° C. After distilling off the first runnings oil there are obtained 50.5 kilograms of an oil having the following characteristics:

| | |
|---|---|
| Viscosity at 38° C degrees Engler | 70.1 |
| Viscosity at 99° C do | 6.0 |
| Viscosity index | 121 |

This oil is heated while excluding air for from 6 to 10 hours in a vessel lined with V2A-steel to 330° C. An oil is then obtained having the following characteristics:

| | |
|---|---|
| Viscosity at 38° C degrees Engler | 23.56 |
| Viscosity at 99° C do | 2.82 |
| Viscosity index | 123 |
| Coke test | 0.12 |
| Setting point degrees centigrade | —39 |

This oil is quite an excellent aviation motor oil. When its lubricating power is tested under very sharp conditions such as occur in practice at the most for very short periods, a running time of 30 hours is obtained before the motor of the piston rings commence to stick. Under the same conditions ring sticking occurs even after 15 hours with one of the best commercial aviation motor oils.

The lubricating oil obtained may be still further improved by the admixture therewith of an oxidation preventer, such as are well known in the art.

What we claim is:

1. The process of producing a high quality lubricating oil which comprises contacting with a polymerizing agent, selected from the group consisting of anhydrous aluminum chloride containing less than 5 per cent of residue incapable of sublimation and the double compounds of such aluminum chloride with olefines, at a polymerizing temperature and in the presence of an inert solvent a gas essentially comprising ethylene, which gas is free from oxygen and sulphur and the compounds of these elements the reacting materials being precluded from contact with free iron.

2. The process claimed in claim 1, in which the gas comprising ethylene contains at least 70 per cent of gaseous olefines.

3. The process claimed in claim 1, in which the gas comprising ethylene contains at least 80 per cent of gaseous olefines.

4. The process claimed in claim 1, in which the reacting materials are confined in a reaction space consisting of a material selected from the group consisting of nickel, chromium and alloy steels containing at least one of these elements.

5. The process claimed in claim 1, in which the aluminum chloride contains less than 2.5 per cent of residue incapable of sublimation.

6. The process claimed in claim 1, in which the gas comprising ethylene contains at least 80 per cent of gaseous olefines, the reacting materials are confined in a reaction space consisting of a material selected from the group consisting of nickel, chromium and alloy steels containing at least one of these elements, and the aluminium chloride contains less than 2.5 per cent of residue incapable of sublimation.

WOLFGANG HAAG.
GERHARDT HOFMANN.
HERMANN ZORN.